United States Patent Office 3,553,111
Patented Jan. 5, 1971

3,553,111
COMPOSITIONS FOR RENDERING SYNTHETIC HYDROPHOBIC MATERIAL ANTISTATIC
Wlodek L. Ginilewicz and Guiliano C. Tesoro, New York, N.Y., assignors to Millmaster Onyx Corporation, New York, N.Y., a corporation of New York
No Drawing. Filed Sept. 21, 1959, Ser. No. 841,032
Int. Cl. C08g 30/14
U.S. Cl. 260—2          15 Claims This invention relates to compositions of matter containing epoxy compounds and water-soluble secondary and tertiary amine polymers, to the insoluble cross-linked reaction products of the epoxy compounds with the water-soluble secondary and tertiary amine polymers, and also to the process of preparing the insoluble cross-linked reaction products.

The invention also includes an improved method of finishing textile materials, and particularly of hydrophobic textile materials, to impart durable antistatic properties thereto and to impart improved dyeing properties thereto. The invention also includes the resultant finished textile materials.

The process of preparing the water soluble secondary and tertiary amine polymers used in the preparation of the new products of this invention are disclosed and claimed in pending application Ser. No. 561,365 of Emery I. Valko et al. filed Jan. 25, 1956 and Ser. No. 666,234 of Guiliano Tesoro et al. filed June 17, 1957.

It has now been found that these water-soluble secondary and tertiary amine polymers may be cross-linked with epoxy compounds to form improved insoluble reaction products which may be employed in the treatment of textile materials to impart durable antistatic properties thereto.

The water-soluble secondary and tertiary amine polymers used in the preparation of the products of this invention are prepared, as disclosed in the said pending applications, by reacting nitrogen alkylating diester compounds of inorganic acids with aliphatic amino compounds selected from the group consisting of aliphatic primary monoamines and aliphatic polyamines containing at least two primary amino groups.

The aliphatic primary monoamines which may be employed in the preparation of the intermediate products of this invention, that is, the water-soluble secondary and tertiary amine polymers (and particularly the tertiary amine polymers) may be represented by the following formula $$RNH_2$$

where R is an uninterrupted, unsubstituted alkyl or alkene radical, an interrupted alkyl or alkene radical interrupted by one or more non-functional hetero atoms such as N, O, S, and the like, or a substituted alkyl or alkene radical in which one or more of the hydrogen atoms is substituted by methyl groups, hydroxyl groups and the like.

Examples of such aliphatic primary monoamines suitable for use in preparing the tertiary amine polymers employed in this invention include methylamine, ethylamine, propylamine, butylamine, amylamine, hexylamine, dodecylamine, allylamine, monoethanol amine, 3 isopropyl-n-propyl amine, 3 methoxy-n-propyl amine, and the like. Mixtures of the amines can also be used.

The aliphatic polyamines containing at least two primary amino groups which may be employed in the preparation of the intermediate products of this invention, that is, the water-soluble secondary and tertiary amine polymers (and particularly the secondary amine polymers) may be represented by the following formula $$H_2NRNH_2$$

where R is an uninterrupted, unsubstituted alkyl or alkene radical, an interrupted alkyl or alkene radical interrupted by one or more non-functional hetero atoms such as N. O. S. and the like, or a substituted alkyl or alkene radical in which one or more of the hydrogen atoms is substituted by methyl groups, hydroxyl groups and the like.

Examples of such aliphatic polyamines suitable for use in preparing the secondary amine polymers employed in this invention include diethylene triamine, bis (3-aminopropyl) amine (commercially available under the name of 3,3'-imino bis-propylamine, bis (2-aminopropyl)amine (commercially available under the name dipropylene triamine), hexamethylene diamine, triethylene tetramine, tetraethylene pentamine, etc. Mixtures of amines can be used.

The nitrogen alkylating diester compounds of inorganic acids which may be used to react with the aliphatic primary monoamines to form the water-soluble tertiary amine polymers employed in the present invention include alkylene and aralkylene alkylating diesters and particularly the alkylating diesters of polyethylene glycols and polyethylene glycol derivatives. The nitrogen alkylating diester compounds of inorganic acids which may be used to react with the aliphatic polyamines containing at least two primary amino groups include the alkylating diesters of polyethylene glycols and polyethylene glycol derivatives. An alkylating diester of an inorganic acid may be defined as a diester of an inorganic acid capable of entering into an alkylating reaction.

Examples of these alkylene and aralkylene alkylating diesters are 1,3-dichloropropanol, 1,3-dibromopropanol diiodides, dichlorides and dibromides of ethylene, hexamethylene, di(chloromethyl) benzene, the trichloride and triiodide of ethoxylated trimethylol propane, the dibromides of 1,6-hexanediol and 1,10-decanediol, and the like.

The nitrogen alkylating diesters of polyethylene glycols which can be used include those represented by the following formula:

$$X(CH_2CH_2O)_nCH_2CH_2X$$

where X is the ester forming residue of an inorganic acid or of an organically substituted sulfuric, phosphoric, or sulfonic acid such as Cl, Br, I, $CH_3SO_3$, $OSO_3H$, and the like, and where $n$ is an average number between 1 and 100.

Examples of alkylating diesters of polyethylene glycols are the diiodides and dichlorides of triethylene glycol and polyethylene glycols having higher average molecular weights of e.g., about 300, about 600, about 1000, about 1540, etc. or mixtures thereof.

The nitrogen alkylating diesters of polyethylene glycol derivatives which can be used include those represented by the general formula $$XCH_2CH_2(OCH_2CH_2)_mORO(CH_2CH_2O)_nCH_2CH_2X$$

where $m$ and $n$ are average numbers between 3 and 40, and R is a divalent radical such as, for example, a glycol radical, a dibasic acid radical OCACO, where A is the intermediate divalent radical of the dibasic acid or a diurethane radical OCNHANHCO where A is again an intermediate divalent radical of the diurethane, and where X is the ester forming residue of an inorganic acid or of an organically substituted sulfuric, phosphoric, and sulfonic acid such as Cl, Br, I, $CH_3SO_3$, $OSO_3H$, and the like.

Some examples of such polyethylene glycol derivatives include polyethylene glycol di-p-toluene sulfonates, polyethylene glycol dimethanesulfonates, and the like.

The polyethylene glycol diesters can be prepared by appropriate esterification reactions. For example, polyethylene glycol dichlorides can be prepared by reacting polyethylene glycols with thionyl chloride in the presence of pyridine or other base. Polyethylene glycol diiodides can be prepared by reacting polyethylene glycol dichlorides with equivalent amounts of sodium iodide either in absence of a solvent, or in presence of a solvent in which the sodium chloride formed as a by-product is essentially insoluble, such as acetone. Polyethylene glycol disulfates can be prepared in the form of their ammonium salts by reacting the glycols with equivalent amounts of sulfamic acid. Polyethylene glycol di-p-toluene sulfonates can be prepared by reacting the glycols with p-toluene sulfonyl chloride in presence of equivalent amounts of pyridine (or other base). Polyethylene glycol dimethanesulfonates can be prepared by reacting the glycols with methane sulfonyl chloride in presence of equivalent amounts of pyridine (or other base). The last two esters are examples of organically substituted inorganic acids.

The polyglycol dihalides which contain a dibasic acid radical between the polyglycol chains can be prepared from a dibasic acid or anhydride by esterification with the polyethylene glycol halohydrin. The polyglycol esters which contain a diurethane radical between the polyglycol chains can be prepared by addition reaction of a polyethylene glycol halohydrin with diisocyanates.

The polyethylene glycol halides and particularly the dichlorides and diiodides are particularly advantageous for reaction with the aliphatic amino compounds of this invention to form the water-soluble secondary and tertiary amine polymers employed in the present invention.

In reacting the nitrogen alkylating diester compounds of inorganic acids with the aliphatic primary amines such as those described above, use is made of the bi-functional nature of the primary amine and the reaction is carried out under such conditions that substantially both of the hydrogens of the primary amine will enter into the alkylation reaction. In order to assure that the reactivity of the primary amine and the intermediate secondary amine is preserved, the reaction is carried out in the presence of an acid acceptor such as sodium carbonate, sodium hydroxide, potassium hydroxide, and the like. If acid acceptors were not present, a portion of the amino groups would be converted into their salt with the formed by-product hydrohalides and other acids formed in the alkylation reaction, and consequently the amino groups would lose their reactivity to some extent. Therefore, under the usual reaction conditions, the reaction would stop before the starting materials are substantially converted into the linear polymers. The amount of acid acceptor or alkali used should be approximately the stoichiometric equivalent to the amount of by-product acid formed during the alkylation reaction.

These aliphatic primary amines and the nitrogen alkylating diesters are mixed in the desired proportions together with a suitable acid acceptor and solvent. After the admixture of the starting materials, the alkylation reaction takes place. The reaction will, in some cases, proceed at room temperature, while in other cases elevated temperatures are used to carry out the reaction.

This reaction can in some instances be carried out in the absence of solvents or in the presence of solvents such as water or organic solvents such as ethylene glycol and isopropyl alcohol. It is advantageous to use a solvent in which the acid acceptor or alkali used would dissolve to some extent.

In reacting the aliphatic primary amines with the nitrogen alkylating diesters, the formation of some quaternary monomer groups may result by reaction of the polymeric molecules with the alkylating agent. If the resulting polymer is to be obtained in soluble form the quaternization with the alkylating diesters substantially exceeding the formation of one quaternary group per polymeric molecule should be avoided.

The primary monoamines and the nitrogen alkylating diesters can be used in various proportions. It is advantageous to use approximately equimolecular proportions to form the linear polytertiary amines. When using approximately (within about 10%) equimolecular proportions of the primary monoamine and the nitrogen alkylating diester the reaction can be carried to substantial completeness to form the soluble polytertiary amine polymers of this invention. When using an alkylating diester in proportions much in excess of 10% of the equimolecular proportions the reaction should be stopped before it is completed if a soluble product is desired. The reaction with the primary monoamine much in excess of 10% of the equimolecular proportions will result in the formation of a soluble product of lower molecular weight than can be obtained by the use of approximately equimolecular proportions.

The linear polytertiary amines obtained are soluble in water or in non-aqueous solvents depending upon the nature of the alkyl group present in the original primary monoamine and the nature of the alkylene group present in the alkylating dihalide or diester molecule. By using comparatively short alkylene groups, water-soluble products are obtained. The water solubility is also increased when the alkylating diester contains polar groups such as ether oxygen as it is with the cases in polyethylene glycol dihalides, for example. Solubility in organic solvents is promoted by using a higher alkyl or alkene radical in the primary monoamine.

In reacting the nitrogen alkylating diester compounds with the aliphatic polyamines containing at least two primary amino groups to produce the intermediate products of this invention (particularly the water-soluble secondary amine polymers) the aliphatic polyamines and the nitrogen alkylating diesters are advantaeously used in such a ratio that not much less than one atom of basic nitrogen (other than tertiary) is present for each reactive halogen atom or other ester forming residue. If the amount of basic nitrogen is less, cross-linked addition products will form less readily. After admixture of the starting materials, the addition, namely alkylation of the basic nitrogen, takes place. The reaction will, in some cases, proceed even at room temperature, while in other elevated temperatures are used to accelerate the reaction. The alkylation of the primary amino groups of the aliphatic polyamines by the nitrogen alkylating diesters of inorganic acids is an additional reaction which converts the primary amino group into a salt of a secondary amine.

This reaction between the nitrogen alkylating diesters and these aliphatic polyamines containing at least two primary amino groups can in some cases be carried out in the absence of a solvent, or in the presence of solvents such as water or organic solvents such as methanol, butanol, isopropanol, ethylene glycol, and the like.

In some cases, it is advantageous to start with proportions of these polyamines and the nitrogen alkylating diesters, in which there is approximately one basic nitrogen for each reactive halogen or other ester forming residue. When equivalent quantities of halide and amine are used, for many purposes, it is desirable to carry out the process under such conditions that alkylation proceeds only partially, since, when between 70% and 95% (depending on the nature and ratio of the reagents employed) of the halide or other esters has reacted, formation of insoluble cross-linked polymers may take place.

In reacting the nitrogen alkylating diester compounds with the aliphatic polyamines containing at least two primary amino groups the polyethylene halides and particularly the polyethylene glycol dichlorides and diiodides are particularly useful. The diiodides react more readily than the dichlorides and will react at ordinary temperatures in water solution with dichlorides, higher temperatures are advantageously used. The extent to which the reaction of the dihalides has taken place is established by determining the percentage of ionized halide in the reaction product. The ionized halide can be titrated argentometrically. The halogen content in the glycol dihalide is not ionized, but the halide set free by the reaction is ionized.

This reaction of the nitrogen alkylating diester compounds with the aliphatic polyamines containing at least two primary amino groups can be carried out in water solution by allowing the solution to stand at room temperature. The following table shows the reaction of the diiodide of polyethylene glycol of about 600 average molecular weight with different polyamines in water solution containing 25% of the reactants in the proportions indicated. In this table, the percent reaction shows the percentage of ionized iodine and the extent to which the reaction of the diiodide had taken place at the temperature and for the periods of time indicated. All the products were clear, almost colorless solutions of the reaction products in water.

TABLE I

| Amine used and mols | Halide used and mols | Time, hrs. | Temp., ° | Percent reaction |
| --- | --- | --- | --- | --- |
| Hexamethylene diamine, 0.03 | Polyethylene glycol 600 diiodide, 0.03 | 20 | 25 | 56 |
| | | 97 | 25 | 79 |
| Hexamethylene diamine, 0.015 plus Diethylene triamine, 0.01. | do | 20 | 25 | 44 |
| | | 97 | 25 | 68 |
| Diethylene triamine, 0.03 | do | 20 | 25 | 40 |
| | | 97 | 25 | 66 |
| 3,3' imino bispropylamine, 0.03 | do | 20 | 25 | 47 |
| | | 97 | 25 | 69 |
| Do | Polyethylene glycol 600 diiodide, 0.045 | 20 | 25 | 39 |
| | | 97 | 25 | 62 |

The water soluble linear secondary and tertiary amine polymers used according to this invention and prepared as described above are reacted with epoxy compounds to form the new insoluble cross-linked reaction products of this invention.

These epoxy compounds which may be employed according to this invention are poly-functional epoxy compounds which may be represented by the following general formula:

where R is an uninterrupted, unsubstituted alkyl or alkene radical, an alkyl or alkene radical interrupted by one or more non-functional hetero atoms such as O, S and the like, or a substituted alkyl or alkene radical in which one or more of the hydrogen atoms is substituted by methyl groups, hydroxyl groups and the like. X is the epoxy radical and Y is either an epoxy radical or a halogen radical. When R contains no functional groups of the Y type, the epoxy compound is bi-functional. If R contains one radical of the Y type, the epoxy compound is tri-functional. Therefore, R may or may not contain any such radicals of the Y type or may contain one or more such radicals.

Examples of such epoxy compounds available for use in preparing the new products of this invention include butadiene dioxide, diglycidyl ether (diglycidyl ethers of bisphenol A, glycerol, polyoxyethylene glycol, pentamethylene glycol, trimethylol propane, erythritol, pentaerythritol, ethylene glycol, resorcinol, 2,3 butanediol bisphenol F, hydroquinone), epihalohydrin, and such epoxy compounds as di-(2,3-epoxy propoxy methyl) carbinol, marketed by Shell Chemical Company under the trade name Eponite 100 and Epon 562. Mixtures of these epoxy compounds may be used.

The molecular weight of the epoxy compounds used according to this invention may vary from 90 to 4500 and may be either water soluble or insoluble. It is preferred, however, that they be water soluble or solubilizable so that they may be readily mixed with the water soluble secondary and tertiary amine polymers. These amine polymers themselves, in some cases, will promote the solubility of the epoxy compounds. The insoluble epoxy compounds can also be solubilized or dispersed with various dispersing or emulsifying agents (so long as these agents will not interfere with the reactions to be accomplished) such as polyvinyl alcohol, fatty acids and so forth as understood by those skilled in the art.

Although the curing, that is the cross-linking, of the amine polymers with the epoxy compounds is preferably carried out in a water medium, alcohols, ketones, halogenated hydrocarbons or other suitable solvents may also be advantageously employed in the preparation of solutions, dispersions, or emulsions in which the said curing reaction may take place. Curing, in the general sense, is the energizing process which allows the water soluble linear amine polymers, which have reactive sites, to react with molecules capable of forming a three dimensional infinite network and thereby insolubilize the linear polymers.

In the curing reaction, various catalysts may be advantageously employed such as $CH_3COOH$, $HOCH_2COOH$, $HNO_3$, $H_3PO_4$, HCl, $H_2SO_4$, $HClO_4$, NaOH and $Ca(OH)_2$. For example, when $HClO_4$ is employed in a sufficient quantity to effect a pH of about 6 in the medium in which the reaction takes place, the reaction time is about 7–10 minutes and the temperature is 120° C.

The reaction can be carried out at temperatures generally ranging from about 50 to 250° C. As a practical matter, however, both lower and higher temperatures may be used as will be apparent to those skilled in the art. The particular curing temperature used will depend on a number of variables such as the particular epoxy compound used, the particular secondary or tertiary amine polymer used, and so forth. The most advantageous curing temperature for the particular system involved can be readily determined by those skilled in the art by routine experimentation. The curing time can also be varied quite widely depending upon the particular system being cured and the temperatures used. Generally we have found a curing temperature of about 120° C. for about 5 minutes is advantageous.

The curing reaction can generally be carried out advantageously in a medium having a range which may vary from about 4 to about 11; however, both a lower or higher pH may be employed, depending upon the particular system being cured. The fact that this pH range may be so broad, and that a rather low pH may therefore be employed, is of particular importance. An alkaline pH may be objectionable when the fabric to be treated must be crease or shrink resistant, or where certain classes of cationic dyestuffs are employed (such as malachite green), or where certain fabrics which darken or disintegrate in an alkali medium are employed (such as Orlon, cellulose acetate, cellulose triacetate), or where acrylic finishes are employed (a color distortion results), or where incompatability with other finishing agents (such as polyvinyl acetate, acrylics) results. Also, dyed fabric, when subjected to a high alkaline bath, will exchange or bleed the dye by ion exchange mechanism. Natural fibers, for example, wool, when used in union with synthetic hyrdophobic fibers, and when subjected to a highly alkaline environment will shrink excessively and effect the physical properties and strength of the fabric.

The extent of the curing reaction is usually determined by the amount of insolubilized resin on the fabric. This may be determined by weight difference by simply rinsing the unreacted portion of resin and determining the weight gain as compared with the untreated fabric. The amount of cross-linked and unremoved resin indicates the efficiency of curing operation. The reacted, insolubilized, resin can also be determined by adsorption of anionic dye to cationic sites in the cross-linked polymer.

The dye is then extracted by ion-exchange technique and amount of dye determined colorimetrically. However, the most important factor is the performance of cross-linked resin on the fabric.

The resins or gels produced as cross-linked polymers according to this invention have ion exchanged properties and are useful as ion exchange materials. For example, epoxide compounds resulting from the reaction of thiodiglycol with epihalohydrin may be employed.

Instead of producing the insoluble products by themselves, they can be produced in the presence of an inert material or carrier such as silica gel or other refractory as a carrier of the ion exchange products. The production of the insoluble cross-linked polymers in the manner described enables the properties of the products to be determined from the standpoint of the extent of their reaction and their ion exchange properties.

The epoxy-water soluble secondary and tertiary amine polymer compositions of this invention can be advantageously used for the impregnation of hydrophobic textile materials. When applied to textiles they are cured in situ to form an insoluble finish thereon. This finish increases the value and usefullness of textile materials. In particular, it reduces the tendency of textile material to accumulate electrostatic charges.

It is known to the trade that impregnation of hydrophobic textile materials with certain compounds greatly reduces their tendency to accumulate electrostatic charges. Such compounds are commonly called antistatic agents or finishes. However, practically all these finishes are removed by laundering, dry-cleaning, or by mere rinsing with water.

There is a definite need for a finish or treatment which would impart to textiles the property of dissipating electrostatic charges and which would withstand repeated laundering and dry-cleaning. Such a finish can be termed a durable antistatic finish.

The compounds of the invention whe properly applied to hydrophobic textile materials, act as durable antistatic finishes, extremely resistant to washing and dry-cleaning. The appearance and hand of the cloth are not unfavorably affected by the finish, and at the same time it is possible to impart a wide range of properties to the treated cloth, (e.g. stiffness, softness, body) by adequately choosing the raw materials for the addition product applied.

Another extremely useful property of our new finishes is to adsorb from an aqueous bath acid dyes and to hold them. Use can be made of this property to dye economically textile materials made from hydrophobic or cellulose fibers. Hydrophobic fibers can be dyed with known methods only with the aid of high pressure or with the assistance of certain compounds called carriers or with a selected and limited group of dyes. These dye methods impose severe limitation on the selection of color and depth of color and they are usually costly.

Our new finish enables the finished fabric to be dyed by members of the large group pigment, acid, or wool dyes at comparatively low cost.

An outstanding property of the new finish is to reduce or eliminate the tendency of textile materials consisting of or prepared from hydrophobic fibers and filaments to accumulate electrostatic charges.

Hydrophobic fibers are synthetic fibers which have a comparatively low capacity to retain moisture in comparison with such fibers as cotton, wool, and rayon. Such fibers are nylon fibers (e.g. those called nylon 66 which are prepared by condensation of 1,6 hexamethylene diamine and adipic acid; those called nylon 6 which are prepared by polymerization of 6-amino caproic acid); Orlon acrylic fibers (Orlon is a trademark of the E. I. du Pont de Nemours & Co.) prepared by polymerization of acrylonitrile; Dacron polyester fibers (Dacron is a trademark of the E. I. du Pont de Nemours & Co.) prepared by condensation of terephthalic acid and ethylene glycol; cellulose triacetate fibers (marketed under the trademark Arnel by the Celanese Corporation of America); Dynel fibers (Dynel is a trademark of the Carbide & Carbon Chemical Co., a division of Union Carbide Corp.) which are copolymers of acrylonitrile and vinyl chloride; Acrilan fibers (Acrilan is a trademark of the Chemstrand Corp.) and similar synthetic fibers.

Textile materials prepared from hydrophobic fibers accumulate electrostatic charges when exposed to rubbing, e.g. in processing where the filament or fiber and its assemblies are led over guides, or in weaving, or even in use and wear.

In processing, accumulation of electrostatic charges may cause yarn ends to stick or tangle severely on machines. Charged fabrics may attract and hold tenaciously lint and soil, and they are often difficult to cut and sew. Finished garments have a tendency to cling to the body, and spark discharges may also occur, which in some instances (such as in the operating room, in electronic research laboratories, etc.) constitute a significant hazard.

The accumulation of charges is assumed to be due to the inability of the textile materials to dissipate the charges as fast as they are generated by rubbing. An adequate measure of the ability of the textiles to dissipate charges is their electrical conductance (or electrical resistivity which is the reciprocal value of conductance). It is known that a specific area conductivity of the textile material higher than $10^{-12}$ reciprocal ohm (i.e. a specific area resistivity lower than $10^{12}$ ohm) is sufficient to consider the textile material as having no objectionable tendency for the accumulation of charges. A higher specific area resistance is usually indicative of the tendency to accumulate charges.

We define the specific area resistivity of the fabric as its electrical resistivity between two parallel metallic electrodes placed at a distance equal to their length. When the distance between electrodes is $n$ times their length, the measured resistance must be divided by $n$ in order to obtain the specific area resistance. The instruments used to measure electrical resistance are well known, e.g. a Wheatstone bridge may be used, or a strip of fabric is placed between electrodes connected across a device for measuring electric potential (voltage) having a very high leakage resistance and a potential is then applied across the fabric; the source of potential is then disconnected from the electrodes. From the observed rate of discharge of the initial potential and from the capacitance of the system the specific area resistivity can be calculated.

The electric resistance of textile materials depends on their moisture content, which in turn is a function of the relative humidity of the surrounding atmosphere. Therefore measurement of electrical resistivity of the fabric must be carried out as a known relative humidity level in order to give reproducible results. Most of our measurements, as indicated in the following examples, were carried out at relative humidity between 30% and 50%.

The invention will be further illustrated by the following examples, but it will be understood that the invention is not limited thereto. Parts are by weight. The number following "polyethylene glycol" indicates the average molecular weight thereof. Neutronyx (600) is alkylphenol polyglycol ether containing about 9½ moles ethylene oxide.

PREPARATION OF SECONDARY AMINE POLYMERS

Example 1

103 parts of diethylene triamine, 306 parts of the dichloride of polyethylene glycol 600 and 400 parts of butanol are mixed in a vessel equipped with mechanical stirrer, thermometer and reflux condenser. The mixture is heated with vigorous agitation at the reflux temperature (120° C.) for two hours. A precipitate of diethylene triamine dihydrochloride forms during this heating period.

At the end of two hours, argentometric titration indicates that 92.5% of the available chloride has reacted. 100 parts of water are added, and the butanol is vacuum distilled, care being taken that the temperature of the residue does not exceed 70° C. (at 40–60 mm. of Hg). The resulting product is viscous, yellow and completely water soluble. The percentage of active ingredient is determined by oven drying, and the product is then diluted to any desired concentration with water. A solution containing e.g. 50% of active ingredient can then be conveniently prepared, stored and handled.

Example 2

154.5 parts of diethylene triamine, 612 parts of the dichloride of polyethylene glycol 600 and 600 parts of butanol are reacted by the procedure described in Example 1. At the end of two hours, argentometric titration indicates that 98% of the available chloride has reacted. After working up (as in 1), the product is more viscous than the product of Example 1, and is more readily polymerized to an insoluble mass by heating, but a 20% aqueous solution is sufficiently stable to be conveniently stored and handled at room temperature.

PREPARATION OF TERTIARY AMINE POLYMERS

Example 3

18.6 parts of anhydrous methylamine, 112.3 parts of the dichloride of triethylene glycol, 305 parts of ethylene glycol, and 127.3 parts of sodium carbonate were mixed in an autoclave equipped with mechanical agitator and thermometer well. The autoclave was heated in an oil bath. The temperature of the mixture was held at 120° C. for 1 hour (the pressure of the system did not exceed 48 lbs./in.). Analysis for ionic chloride by argentometric titration indicated that 95.9% of the theoretical reaction had taken place. The salts were filtered off, leaving a clear yellow viscous product which consisted of a 30% active solution of the polytertiary amine in ethylene glycol.

Example 4

6.2 parts of anhydrous methylamine, 299 parts of the dichloride of polyethylene glycol 1540, 305.2 parts ethylene glycol, and 42.4 parts of sodium carbonate were mixed in an autoclave equipped with mechanical agitation and thermometer well. The mixture was heated in the autoclave by means of an oil bath at 130° C. for 3½ hours, during which time the internal pressure did not exceed 8½ lbs./in.² Analysis for ionic chloride indicated 91.5% conversion of the dichloride. The salts were filtered off leaving a clear yellow viscous product which consisted of a 50% active solution of the polytertiary amine in ethylene glycol.

Example 5

5.67 parts methylamine, 195 parts of the dichloride of polyethylene glycol 1000, 201 parts of ethylene glycol, and 38.8 parts of sodium carbonate were mixed in an autoclave equipped with mechanical stirrer and thermometer well. The mixture in the autoclave was heated by means of an oil bath to 128° C. and held at that temperature for 3 hours, the internal pressure not exceeding 8 lbs./in.² Analysis for ionic chloride indicated 90% conversion. The salts were filtered off leaving a clear yellow viscous product.

Example 6

15.5 parts methylamine, 171.5 parts of the dichloride of polyethylene glycol 300, 436 parts of ethylene glycol, and 106 parts of sodium carbonate were mixed in an autoclave equipped with mechanical agitator and thermometer well. The autoclave was heated in an oil bath raising the temperature of the mixture to 125° C. for 1 hour. The internal pressure of the autoclave did not exceed 17 lbs./in.² Analysis for ionic chloride showed that 91.5% of the theoretical reaction had taken place. The salts were filtered off leaving the product clear, viscous, and yellow.

Example 7

24.4 parts of monoethanolamine, 251.2 parts of the dichloride of polyethylene glycol 600, 275.6 parts of ethylene glycol, and 84.8 parts of sodium carbonate were mixed in a three-necked reaction flask equipped with mechanical agitator, thermometer, condenser, and heating mantle. The mixture was heated at 127° C. for 5 hours. Analysis for ionic chloride indicated that 96.8% of the theoretical reaction had taken place. 742 parts of water were added to give a 20% active solution of polytertiary amine which was dark yellow in color.

Example 8

22.8 parts of allylamine, 251.2 parts of the dichloride of polyethylene glycol 600, 274 parts of ethylene glycol, and 84.8 parts of sodium carbonate were mixed in an autoclave equipped with a mechanical agitator and thermometer well. The autoclave was heated in an oil bath, bringing the temperature of the mixture to 130° C. and held for 3 hours. 737 parts of water were added and the mixture was placed in a separatory funnel. 630 parts of water containing inorganic salts were split out and removed. 630 parts of water were added to give a 20% solution of deep yellow color. The water-salt layer and the product were analyzed for the amount of ionic chloride present, and the total amount found indicated that 92.1% of the theoretical reaction had taken place.

Example 9

156 parts of dodecylamine (Armeen 12D, manufactured by Armour Chemical Co.), 502.4 parts of the dichloride of polyethylene glycol 600, and 440 parts of ethylene glycol were mixed in a three-necked reaction flask equipped with mechanical agitator, thermometer, condenser, and heating mantle. The temperature of the mixture was raised to 150° C. and held for 4 hours. At specific intervals during the reaction, potassium hydroxide was added in amounts not to exceed stoichiometrically the amount of reaction which had taken place until 83.6 parts had been added. After the reaction time, the mixture was cooled and the salts were filtered off. Analysis of the salts removed and of the product indicated that 96% of the theoretical reaction had taken place. The resulting solution containing 60% polyamine was a dark red viscous liquid.

Example 10

25.3 parts n-hexylamine, 157 parts of the dichloride of polyethylene glycol 600, 182 parts of ethylene glycol, and 53 parts sodium carbonate were mixed in a three-necked reaction flask equipped with thermometer, mechanical agitator, condenser, and heating mantle. The temperature of the mixture was brought to 130° C. and held for 4½ hours. Analysis of the mixture for percent ionic chloride indicated that 88.5% of the reaction had taken place. The salts were filtered off using a Buchner funnel and vacuum. The product was a reddish colored viscous liquid consisting of a 50% active solution of polyamine in ethylene glycol.

Example 11

18 parts of ethylamine, 251.2 parts of the dichloride of polyethylene glycol 600, 269.2 parts of ethylene glycol, and 84.8 parts of sodium carbonate were mixed in an autoclave equipped with mechanical agitator and thermometer well. The autoclave was heated in an oil bath and the temperature of the mixture was brought to and held at 135° C. for a period of 3 hours. (Pressure did not exceed 28 lbs./in.²) 722.8 parts of water were then added to the mixture, which was placed in a separatory funnel. Two layers separated in approximately ½ hour. 471 parts of water containing salts were removed, and 471 parts of water were added to yield a 20% active solution which was yellow in appearance. Analysis of the aqueous layer removed and of the product for ionic chloride indicated that 94.5% of the theoretical reaction had taken place.

Example 12

17.85 parts methylamine, 366 parts of the dichloride of polyethylene glycol 600, 385 parts of ethylene glycol, and 121 parts of soda ash were mixed in a glass lined autoclave which was jacketed to hold steam pressure and was equipped with a mechanical means of agitation and a thermocouple. The mixture was heated to 128° C. and held at this temperature for 3½ hours. The internal pressure of the autoclave ranged at this temperature from 35 lbs./in.$^2$ to 45 lbs./in.$^2$. (The steam pressure in the jacket never exceeded 26 lbs./in.$^2$.) After the reaction time of 3½ hours a sample of the slurry was analyzed for percentage of ionic chloride, and it was found that 93.7% of the dichloride of polyethylene glycol 600 had reacted with the amine. 825 parts of water were added to the mixture after cooling to 80° C. in order to dissolve the salts and separate them in the aqueous layer. The temperature of the mixture, after the addition of the water, was raised to 90° C., the agitation was stopped, and the mixture was left standing for 1½ hours to split out the product. During a period of 4 hours, 453 parts of water and dissolved salts were removed. This was replaced with an equal weight of water to yield a 20% active solution of the polytertiary amine. The solution was clear and straw yellow in color.

PREPARATION OF THE CROSS LINKED AMINO POLYMERS

Example 13

An undyed, bleached, fabric made from Dacron polyester yarn was impregnated with an aqueous 20% solution containing 30 parts of the secondary amine polymer prepared according to Example 1 and 2.35 parts of epichlorohydrin. The pH of the application solution was 11.0. The cloth was cured at 100° C. for 15 minutes. After drying a mild rinse was given with 0.1% non-ionic surfactant (Neutronyx 600) solution to remove unreacted, soluble, material. The dry fabric was subjected to accelerated wash tests which was a modified American Association of Textile Chemist and Colorist Standard Test Method 61–54 111 A Test. Two accelerated washings were made. The sample tested for specific area resistivity showed $2.54 \times 10^{11}$ ohm, whereas identical control (untreated) sample had a specific area resistivity of over $10^{14}$ ohm.

Example 14

An undyed, scoured, nylon tricot fabric made from polyamide yarn was impregnated in a laboratory two roll padder with an aqueous 30% solution of the tertiary amine polymer prepared according to Example 3 and an Eponite 100 (Shell Chemical Co.) solution so as to deposit 2 parts of the polymer per 100 parts of fabric and 2 parts of the Eponite 100 per 100 parts of fabric. To solubilize Eponite 100, equal weight of Elvanol 51–05 (Du Pont's partly hydrolized polyvinyl acetate) to Eponite 100 was used. The cloth was dried at 100° C. for 5 minutes and cured at 120° C. for 5 minutes. The fabric was laundered 20 times (in Westinghouse household washing machine at 60° C. with synthetic detergent), the specific area resistance of a sample with Eponite 100 after 20 launderings increased only to a value of $2.7 \times 10^{12}$ ohm, control sample (untreated) has a value higher than $10^{14}$ ohm.

Example 15

The procedure in Example 14 was repeated, except that 7.0% by weight, based on the Eponite 100, of zinc fluoborate was used as a catalyst. The nylon tricot fabric showed specific area resistance of only 4.9 to $10^{12}$ ohm after 30 launderings.

Example 16

An undyed, scoured, nylon tricot fabric made from polyamide yarn was impregnated in a laboratory two roll padder with 1.4 parts of the tertiary amine polymer prepared according to Example 4 (in a 50% solution) per 100 parts of fabric and 0.6 part of Eponite 100 per 100 parts of fabric. The Eponite 100 was solubilized with a small amount of nonionic surfactant (Neutronyx 600). The solution of the application bath was adjusted to pH 10.0 with phosphoric acid. The specific area resistivity found to be $5.5 \times 10^{11}$ ohms.

Example 17

The procedure in Example 13 was repeated except that the pH was adjusted to 7. The specific area resistivity was found to be $1.0 \times 10^{11}$ ohms.

Example 18

The procedure in Example 13 was repeated except that the pH was adjusted to 6. The specific area resistivity was found to be $3.0 \times 10^{12}$ ohms.

Example 19

An undyed, bleached fabric made from dacron polyester yarn was impregnated with an aqueous 20% solution containing 8 parts of the secondary amine polymer prepared according to Example 1, and 2 parts of trimethylol propane diepoxide. The pH of the application solution was adjusted to 4 by adding HCl to the solution. The cloth was cured at 120° C. for 5 minutes. After drying, a mild rinse was given with 0.1% non-ionic surfactant (Neutronyx 600) solution to remove unreacted, soluble material. The fabric was laundered 20 times (in Westinghouse household washing machine at 60° C. with synthetic detergent). The specific area resistance of the fabric was $7.0 \times 10^9$. After 40 washings the specific area resistance was $1.3 \times 10^{10}$. After 60 launderings the specific area resistance was still $1.3 \times 10^{10}$.

We claim:

1. A composition suitable for minimizing the accumulation of charge of static electricity of a hydrophobic shaped structure comprising a mixture of a polyepoxide and a polyamine of the formula:

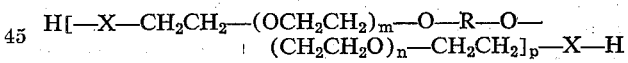

wherein —R— is an organic divalent radical, —X— is a member of the class consisting of amino nitrogen and divalent radical terminating in amino nitrogen, m and n are small whole numbers from about 3 to about 40 and p is an integer greater than 1.

2. The composition of claim 1 in the form of an aqueous emulsion.

3. The composition of claim 1 wherein the polyamine has the formula:

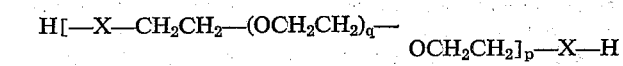

wherein —X— is a member of the class consisting of

and

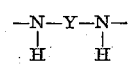

wherein —R′ is a member of the class consisting of lower alkyl and amino lower alkyl, —Y— is a member of the class consisting of divalent aliphatic hydrocarbon and aza containing alkylene, q is a number from about 6 to about 40 and p is an integer greater than 1.

4. The composition of claim 3 wherein

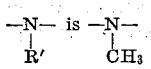

5. The composition of claim 3 wherein the radical

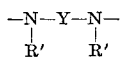

is divalent diethylene triamine.

6. The composition of claim 1 wherein the polyepoxide is a reaction product of glycerin and epichlorohydrin.

7. A synthetic, hydrophobic textile bearing the reaction product of a polyepoxide and the polyamine of claim 1.

8. A synthetic, hydrophobic textile bearing the reaction product of a polyepoxide and the polyamine of claim 3.

9. The structure of claim 7 wherein the textile is in the form of a filament.

10. The structure of claim 7 wherein the textile is in the form of a fabric.

11. The structure of claim 7 wherein the textile is formed from a polymer of acryonitrile.

12. The structure of claim 7 wherein the textile is formed from a polyamide.

13. The structure of claim 7 wherein the textile is formed from a polyester.

14. A composition comprising a mixture of an epoxy compound containing at least one epoxy radical and at least one radical selected from the group consisting of an epoxy radical or a halogen radical and a polyamine of the formula:

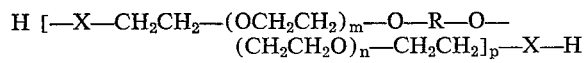

wherein —R— is an organic divalent radical, —X— is a member of the class consisting of amino nitrogen and divalent radical terminating in amino nitrogen, $m$ and $n$ are small whole numbers from about 3 to about 40 and $p$ is an integer greater than 1.

15. The composition of claim 14 in which the epoxy compound is di-(2,3 epoxy propoxy methyl)carbinol.

References Cited

UNITED STATES PATENTS

| | | | |
|---|---|---|---|
| 2,136,928 | 11/1938 | Schlack | 260—2 |
| 2,596,985 | 5/1952 | Cook et al. | 260—404 |
| 2,724,694 | 11/1955 | Troianello | 260—2 |
| 2,174,762 | 10/1949 | Schuette et al. | 260—584 |
| 2,194,906 | 3/1940 | Krzikalla et al. | 260—584 |
| 2,766,288 | 10/1956 | Erickson | 260—584 |
| 2,982,751 | 5/1961 | Anthes | 260—2 |
| 3,021,232 | 2/1962 | Pretka | 260—2 |
| 3,070,552 | 12/1962 | Tesoro et al. | 260—29.2 |

FOREIGN PATENTS

| | | | |
|---|---|---|---|
| 132,541 | 5/1949 | Australia | 260—2 |
| 554,506 | 2/1957 | Belgium | 260—2 |
| 560,446 | 9/1957 | Belgium | 260—2 |

OTHER REFERENCES

Fordyce et al.: Journal American Chemical Society, vol. 61, pps. 1905–1910 (1939).

Flory: "Principles of Polymer Chemistry," p. 93, Cornell Univ. Press, N.Y., 1953.

"Webster's New Collegiate Dictionary," C & C Merriam Co., Springfield, Mass., 1960, p. 437, column 2.

WILLIAM H. SHORT, Primary Examiner

T. E. PERTILLA, Assistant Examiner

U.S. Cl. X.R.

117—138.8, 161; 260—29.1, 29.2, 47, 59